Sept. 29, 1964        H. H. TODD        3,150,446
BRAZING METHOD AND COMPOSITION
Filed Jan. 31, 1961
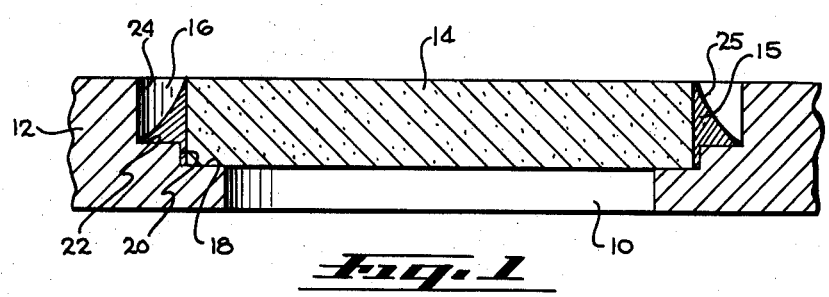
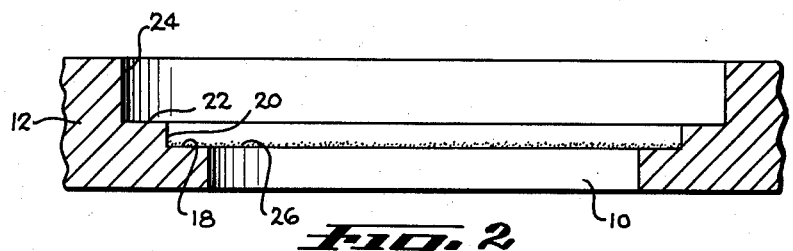
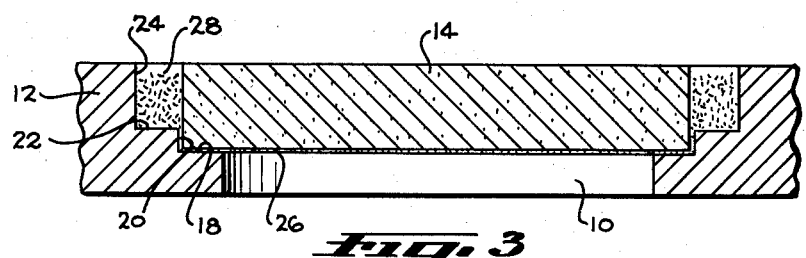
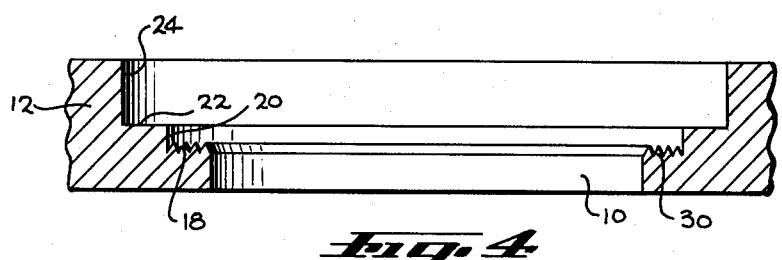
HOYT H. TODD
INVENTOR.
BY *Jess M Roberts*
ATTORNEY 3,150,446
BRAZING METHOD AND COMPOSITION
Hoyt H. Todd, La Habra, Calif., assignor to Electro-Optical Systems, Inc., Pasadena, Calif., a corporation of California
Filed Jan. 31, 1961, Ser. No. 86,028
12 Claims. (Cl. 29—475)

This invention relates to a brazing process and a brazing material for carrying out the process.

The invention is directed primarily to the problem of limiting the spread of brazing material away from a brazed joint. Since a satisfactory brazing material must have excellent wetting action on the base metal to which it is applied, the melted brazing material tends to spread away from the region of application. In many instances, however, it is mandatory that the molten brazing material be confined to the region of the brazed joint and prevented from encroaching to any material extent onto a zone adjacent the joint.

While the invention is widely applicable in various fields for different specific purposes, the initial embodiment of the invention is directed specifically to certain problems encountered in the fabrication of a grid of an ion propulsion system employing cesium surface ionization. Cesium vapor is directed into a porous grid where the impinging cesium atoms re-evaporate in singly ionized form with the loss of one electron for each ion. To avoid undue power losses by radiation over long propulsion periods, an appropriate geometrical arrangement of grid elements is necessary. For this purpose, a grid assembly is employed comprising a plurality of porous grid disks mounted in corresponding suitably distributed apertures in a circular support plate.

Because of the high operating temperature of an ion engine, the grid assembly is made of refractory metals. In a strict sense, among the commercially important metals, only three are classed as refractory, namely, tungsten, molybdenum, and tantalum (see "Metallurgical Dictionary" by Henderson, Reinhold Publishing Corporation, 1953). In the present disclosure and the appended claims the term refractory metal will be used in this strict sense.

In the particular grid assembly here under consideration, the grid elements are made of porous tungsten, the support plate is made of molybdenum, and the grid elements are brazed to the support plate. The brazing material must, of course, meet the usual requirements for brazing. Thus the brazing material must fuse readily with the metals that are to be joined, must form sealed joints and must withstand high operating temperatures. In addition the brazing material must meet certain special requirements for use in an ion engine. The required brazing temperature must not be so high as to cause sintering of the porous tungsten. It is highly important that the brazing material does not infiltrate the porous tungsten either when the brazing operation is performed or later when the grid assembly is in high temperature service. Nor should the brazing material spread over the outer surface of the porous tungsten. The brazing material must be compatible with cesium vapor. Since the grid assembly may be used in a vacuum, the vapor pressure of the brazing material should not be excessive at the contemplated high service temperature.

It has been found that various brazing materials will meet most of the specified requirements but, unfortunately, infiltrate the porous tungsten or spread over the surface of the porous tungsten. To meet this difficulty the invention takes advantage of the fact that the rate at which a molten metal body alloys or enters into solution with a second metal body varies with the area of mutual contact of the two metals. The invention takes advantage of the further fact that the rate at which the alloying progresses is maximum near the interface of the two metals. In a brazing operation the brazing metal is of relatively small volume and all of the small volume is close to the interface between the brazing metal and the base metal with which a bond is to be effected.

The invention takes advantage of these facts by selecting a brazing material that alloys with a critical rate of rise of the melting point. The rate of rise of the melting point is critical with respect to what may be termed the surface ratio involved, i.e., the ratio between the actual area of surface of the base metal in a given zone and the projected area of the zone.

What is meant by this ratio may be understood by considering a horizontal surface of a base metal that is to be bonded by brazing. If the horizontal surface is flat and smooth the surface ratio will be unity since the actual surface area of the metal in the zone equals the area in plan of the zone, i.e., the zone area projected onto a horizontal plane. If the surface of the base metal is rough and deeply serrated, however, the actual area of metal bounded by a 1-inch square is much greater than 1 square inch. If the ratio is 3, for example, the liquid brazing material flowing over the area bounded by the 1-inch square actually contacts 3 square inches of metal surface.

It will be readily appreciated that a layer of finely divided metal has a relatively high surface ratio and that the interior of a porous sintered metal body also has a relatively high surface ratio. The brazing material is selected to discriminate between a relatively low ratio on the order of unity and a substantially higher ratio.

What is meant by selecting a brazing material with a critical rate of rise of melting point with respect to a given base metal is that when the initially applied brazing material is heated to a temperature above but relatively close to its melting point it remains liquid long enough in a zone having a low surface ratio to form an effective bond with the base metal but solidifies promptly upon flowing into initial contact with a zone having a relatively high surface ratio. Thus a brazing material with the critical rate of rising melting point has a selective action to discriminate between a smooth interface and a broken or interstitial interface such as exists along a highly serrated surface or in a mass of powdered metal or in the interior of a highly porous metal body.

An appropriately selected brazing material will bond a highly porous metal body to a smooth, solid metal body without significant penetration into the interior of the porous body. The selected brazing material may be blocked from spreading along a smooth metal surface away from its zone of application into an adjacent zone simply by providing a layer of appropriate finely divided metal in the adjacent zone. Or the metal surface in the adjacent zone may be serrated or otherwise roughened for the same purpose.

Conventional brazing materials selected at random for use with a given base metal will usually have a rate of rise of melting point that is too high or too low. The Hobrock Patent 2,373,117 gives examples of brazing materials that have rates that are much too high for given base metals. The combinations mentioned in the patent include copper for brazing Monel metal, copper for brazing nickel, lead for brazing silver, gold for brazing platinum, bismuth for brazing copper, silver for brazing gold and gold for brazing nickel. Hobrock points out, for example, that if copper is selected for brazing Monel metal and is heated only slightly above its melting point, it solidifies too quickly to bond with even a smooth flat surface of the Monel metal. Hence the necessity of rapidly raising the temperature of the brazing copper after it melts.

On the other hand, it is found that many conventional brazing materials have a sufficiently low rate of rise of melting point with respect to a given base metal to form an effective bond without the necessity of continuing the rise in temperature of the brazing metal but the rate is not high enough to discriminate on the one hand between a solid smooth metal surface and, on the other hand, a porous metal or finely divided metal or deeply serrated or roughened metal surface. Once the principle is understood from the teaching of the present invention, however, it is within the expected skill of the art to select a brazing material that is selective in the desired manner with respect to different interfaces with a given base metal.

The invention and its advantages may be further understood from the following detailed description and the accompanying drawing.

In the drawing, which is to be regarded as merely illustrative:

FIG. 1 is a fragmentary section of a grid assembly showing a porous tungsten grid disk brazed in position across a circular aperture in a molybdenum support plate;

FIG. 2 is a similar sectional view showing how a portion of the aperture in the support plate may be given a coating of finely divided metal in preparation for placing the grid disk in position in the aperture;

FIG. 3 is a similar sectional view at a later point in the procedure showing the brazing material applied in preparation for the heating step that will produce the result shown in FIG. 1; and FIG. 4 is a fragmentary sectional view similar to FIG. 2 showing how a portion of the aperture in the support plate may be serrated instead of being coated with the finely divided metal.

As heretofore stated, the grid assembly is of an appropriate geometrical arrangement of individual grid members seated in apertures in a support plate. FIG. 1 shows a circular aperture 10 in a molybdenum support plate 12 with a porous tungsten disk 14. The tungsten disk spans the aperture 10 and is bonded to the support plate in a sealed manner by solidified brazing metal 15.

The aperture 10 is of stepped configuration to center the tungsten disk 14 and to provide an annular space 16 around the periphery of the disk to receive the brazing material. Thus the aperture has a lower step 18 with an adjacent vertical circular wall 20 to receive and center the tungsten disk and has an upper step 22 with an adjacent vertical circular wall 24 to form the annular space 16. The tungsten grid disk 14 is of highly porous sintered construction.

It is required that the solidified brazing material 15 form a smooth fillet 25 and form a sealing bond between the tungsten disk and the support plate around the whole outer circumferential surface of the tungsten disk including the circumferential surface adjacent the lower vertical circular wall 20 of the aperture. It is essential, however, that the brazing material does not infiltrate the body of the tungsten grid to any material extent and it is further essential that the melted brazing material does not spread radially inward over either of the two faces of the tungsten grid. By brazing the assembly in horizontal position with the annular space 16 uppermost and by taking care that the brazing material does not overflow the annular space the melted brazing material can be prevented from flowing radially inward over the upper or outer face of the grid disk. There is a strong tendency, however, for the melted brazing material to flow radially inward across the lower step 18 and hence across the lower or inner face of the grid disk. Thus there are two zones where flow of the melted brazing material is to be inhibited, the first zone being the interior of the porous tungsten grid immediately adjacent its outer circumferential surface, and the second zone being the region of the lower step 18.

Since the first zone, the porous interior of the tungsten disk, has inherently a high surface ratio, the required inhibition of infiltration is achieved by selecting a brazing material having an appropriate rate of rise of melting point in contact with tungsten. The second zone in the region of the step 18, however, has a low ratio near unity and in accord with the invention a preliminary step is taken to provide the required high surface ratio in this second zone.

FIG. 2 shows how this preliminary step may be taken by coating the step 18 of the aperture 10 with a layer 26 of a finely divided refractory metal. In this instance the powdered metal is tantalum. The powdered metal may be applied in any suitable manner, for example by sprinkling. Preferably the step 18 is painted with a fine suspension of tantalum powder in an acrylic resin vehicle.

FIG. 3 illustrates the next step of seating the tungsten grid disk 14 on the layer of tantalum powder 26. The annular space 16 is then nearly filled with unmelted brazing material 28. When the whole assembly has been prepared in this manner it is ready for the heating step.

The whole assembly is heated until the brazing material is brought to a temperature somewhat above but relatively close to its melting point. In practice the grid assembly is kept under observation and the application of heat is terminated as soon as melting of the brazing material is observed. The melted brazing material promptly assumes the configuration shown in FIG. 1. The melted brazing material tends, of course, to infiltrate the interior of the porous tungsten but the interior has such a high surface ratio that the melting point of the intruding brazing material rises immediately to cause the advancing portion of the brazing material to solidify and thus stop the intrusion. The porosity of the interior of the tungsten divides the advancing melted brazing material into fine capillary bodies having such a high ratio of surface to volume that the freezing action is nearly instantaneous. When the melted brazing material tends to intrude on the tantalum powder on the step 18, the same self-stopping action occurs since the acrylic resin dissipates to expose the individual metal particles to the brazing material.

Instead of applying powdered metal to the step 18 to raise the surface ratio at the step, the surface of the step 18 may be suitably roughened to accomplish the same purpose. FIG. 4 shows how, for example, the surface of the step 18 may be deeply serrated as indicated at 30. The deep serrations raise the surface ratio sufficiently to cause the self-stopping action on the part of the melted brazing material when the melted brazing material initially encroaches on the surface of the step.

The preferred composition of the unmelted brazing material 28 is a mixture of 24.07 grams molybdenum boride (13.5% Boron)
41.8 grams molybdenum carbide (6% Carbon)
35.4 grams molybdenum powder This mixture is weighed out, ground together in a dry state and stored until needed. The mixture is prepared for use by adding a volatile solvent to form a paste. Alcohol is a suitable solvent. It has been found that water is not satisfactory as a vehicle because water oxidizes the mixture to cause drastic increase in its melting point. A volatile solvent instead of a vehicle with a low vapor pressure is used because the latter could leave a carbonaceous residue in the melted brazing material.

The powdered brazing material of the above composition has the following analysis:

94.34% Molybdenum
3.16% Boron
2.50% Carbon

The mixture melts at 1875° C. The boron content may be varied 1% in either direction and the carbon content may be varied 1½% in either direction with satisfactory results. Thus the molybdenum content may vary through the range 91.84% to 96.84%; the boron content may vary through the range from 2.16% to 4.16%; and the carbon content may vary through the range from 1% to 4%. Thus, in general, the mixture contains at least 90% molybdenum and not more than 5% of each of boron and carbon. Decreasing the carbon content may raise the melting point of the brazing mixture 25° C. It is to be borne in mind, however, that a melting point on the order of 1900° C. is far below the melting points of molybdenum, tungsten and tantalum.

In selecting a brazing material for use with a specific base metal, it is helpful to refer to phase diagrams. A good reference for this purpose is "Constitution of Binary Alloys" by Allen, second edition, McGraw-Hill Book Company, 1958. A clue to the behavior of the brazing mixture specified above is that the addition of 1% of boron to molybdenum produces an alloy having a melting point of 1950° C. If the boron content of this alloy is progressively reduced to zero, the melting point jumps 670° C. A further clue is found in the fact that a molybdenum-carbon alloy of 1.8% carbon has a melting point of 2200° C. and progressive reduction of the carbon content to zero raises the melting point by more than 400° C. During the brazing operation the proportions of the metals in the brazing composition at the interface may vary not only because of dilution of the braze composition by the base metal but also by the constituents of the brazing mixture entering into new compositions. For example, the boron content and character of the brazing mixture may be changed by the formation of new borides and the formation of new carbides. It is also to be noted that the presence of the boron increases the ability of the brazing material to wet the surface of the base metal.

It will be apparent to persons skilled in the art that the above brazing composition is widely applicable for bonding refractory metals for high temperature use. The brazing material has special utility not only for ion propulsion devices but also for thermionic converters and various electronic components.

In applying the teachings of the invention for brazing in the lower temperature ranges the same approach is made. Obviously the combinations disclosed in the Hobrock patent are to be avoided because of the excessively high rates of rise of the melting points. Each of the Hobrock brazing materials is a single metal. However, many eutectic mixtures may be used in combination with ferrous metals with the required critical rate of rise of the melting point. For example, reference to a phase diagram reveals that a eutectic of copper 91.6% and phosphorus 8.4% has a melting point of 714° C. Either decrease or increase of the proportion of phosphorus substantially increases the melting point. Such a composition may be used to braze ferrous metals but would have special utility for brazing a porous copper body to a copper support without substantial infiltration of the porous copper. Intrusion of the melted brazing material into a zone having a low surface ratio may be blocked either by the application of powdered copper to the zone or by serrating the surface of the base metal for the same purpose, as heretofore explained.

My description of the specific practices of the invention will suggest various changes, substitutions and other departures from my disclosure within the spirit and scope of the appended claims.

I claim:

1. In a method of bonding together two metal bodies, at least one of which has a zone of relatively high surface ratio contiguous with the region where said bodies are to be joined, by bringing said bodies together to provide a joint, applying molten brazing material to said joint and solidifying the same, the improvement whereby any substantial flow of molten brazing material from said joint into said zone of relatively high surface ratio is avoided, said improvement including the steps of: selecting a brazing material which when melted in contact with the metal constituting said zone progressively alloys therewith with progressive rise in melting point at a rate determined by the surface ratio, said rate being relatively low at unit surface ratio and increasing as the surface ratio increases; applying the selected brazing material to the joint between the two bodies; applying heat to the two bodies to raise the temperature of the brazing material to a point above but relatively close to its melting point with consequent melting thereof; discontinuing the application of heat at this point whereby the molten brazing material remains liquid long enough at the joint to bond the two bodies together while molten brazing material flowing into said contiguous zone solidifies promptly by alloying with the metal in said zone thereby stopping the flow of molten brazing material from said joint.

2. The method of claim 1 wherein one of said bodies initially has a zone of relatively low surface ratio adjacent the joint, said zone of relatively low surface ratio being roughened prior to application of the brazing material to create a relatively high surface ratio whereby molten brazing material flowing into said roughened zone alloys with the metal therein and solidifies to stop the flow of brazing material.

3. The method of claim 1 wherein one of said bodies initially has a zone of relatively low surface ratio adjacent the joint, finely divided metal which alloys with the brazing material being applied to said zone of relatively low surface ratio prior to application of the brazing material to create a relatively high surface ratio and whereby molten brazing material flowing into said zone of initially low surface ratio alloys with said finely divided metal and solidifies to stop said flow of brazing material.

4. The method of claim 1 wherein said two bodies comprise refractory metal and the brazing mixture consists essentially of approximately 92–97% molybdenum, approximately 3–4% boron and approximately 2.5–4% carbon.

5. The method of claim 4 wherein one of said bodies comprises porous tungsten and the other comprises molybdenum.

6. A method as set forth in claim 4 in which the brazing material contains a major portion of powdered molybdenum and minor portions of powdered molybdenum boride and molybdenum carbide.

7. A method of brazing together two refractory metal bodies without substantial intrusion of the brazing material into a zone adjacent the region of application of the brazing material, characterized by the steps of: applying to said zone finely divided refractory metal; applying to the juncture between the two bodies a brazing material consisting essentially of approximately 92–97% molybdenum, approximately 3–4% boron and approximately 2.5–4% carbon; applying heat to the two bodies to raise the temperature of the brazing material to a temperature above but relatively close to its melting point with consequent melting of the brazing material and alloying of the brazing material with the finely divided metal when the melted brazing material reaches said zone; and then terminating the application of heat.

8. A method of brazing together two refractory metal bodies without substantial intrusion of the brazing material into a zone adjacent the joint between the two bodies, characterized by the steps of: roughening the material of one of said bodies in said adjacent zone to create a high surface ratio in the zone; applying to the juncture between the two bodies a brazing material consisting essentially of approximately 92–97% molybdenum, approximately 3–4% boron and approximately 2.5–4% carbon; applying heat to the two bodies to raise the temperature of the brazing material to a temperature above but relatively close to its melting point with consequent melting of the brazing material and flow of the melted brazing material into said zone with consequent alloying of the brazing material with the material of said one body in said zone; and then terminating the application of heat.

9. A brazing composition for refractory metals consisting essentially of approximately 92–97% molybdenum, approximately 3–4% boron, and approximately 2.5–4% carbon.

10. A brazing composition for refractory metals consisting essentially of approximately 94.34 parts of molybdenum, 3.16 parts of boron and 2.5 parts of carbon.

11. A brazing composition as set forth in claim 9 consisting essentially of a mixture of molybdenum powder, molybdenum boride powder and molybdenum carbide powder, the major portion of the mixture being molybdenum powder.

12. A brazing composition as set forth in claim 9 which consists of a mixture in parts by weight of 24.07 parts molybdenum boride (13.5% boron), 41.8 parts molybdenum carbide (6% carbon) and 35.4 parts molybdenum powder.

References Cited in the file of this patent

UNITED STATES PATENTS

| | | |
|---|---|---|
| 1,840,724 | Koehring | Jan. 12, 1932 |
| 2,137,617 | Imes et al. | Nov. 22, 1938 |
| 2,179,836 | Wisler et al. | Nov. 14, 1939 |
| 2,342,357 | Miller | Feb. 22, 1944 |
| 2,373,117 | Hobrock | Apr. 10, 1945 |
| 2,725,287 | Cronin | Nov. 29, 1955 |

OTHER REFERENCES

Journal of Metals, April 1952, pages 391–396.